(12) United States Patent
Talaganov et al.

(10) Patent No.: US 10,097,981 B1
(45) Date of Patent: Oct. 9, 2018

(54) TEST PROCEDURE FOR A MOBILE NETWORK OF AN EMERGENCY CALL NETWORK

(71) Applicant: SIGOS LLC, Wilmington, DE (US)

(72) Inventors: Goce Talaganov, Nürnberg (DE); Chester Calma, Mountain House, CA (US); Mel Kadkhodai, Vienna, VA (US)

(73) Assignee: SIGOS LLC, Wilmington, DE (US)

( * ) Notice: Subject to any disclaimer, the term of this patent is extended or adjusted under 35 U.S.C. 154(b) by 0 days.

(21) Appl. No.: 15/606,718

(22) Filed: May 26, 2017

(51) Int. Cl.
| | |
|---|---|
| *H04M 11/04* | (2006.01) |
| *H04W 4/90* | (2018.01) |
| *H04W 4/22* | (2009.01) |
| *H04W 24/06* | (2009.01) |
| *H04W 76/00* | (2018.01) |
| *H04W 76/50* | (2018.01) |
| *H04B 17/00* | (2015.01) |
| *H04W 24/00* | (2009.01) |

(52) U.S. Cl.
CPC ............. *H04W 4/90* (2018.02); *H04W 4/22* (2013.01); *H04W 24/06* (2013.01); *H04W 76/007* (2013.01); *H04W 76/50* (2018.02)

(58) Field of Classification Search
CPC ...... H04W 4/22; H04W 24/06; H04W 76/007
USPC ........................................................ 455/404.1
See application file for complete search history.

(56) References Cited

U.S. PATENT DOCUMENTS

| | | | | |
|---|---|---|---|---|
| 2008/0132197 A1* | 6/2008 | Koepke | ................... | H04L 12/66 455/404.2 |
| 2017/0339552 A1* | 11/2017 | Xu | ........................ | H04W 8/082 |

* cited by examiner

*Primary Examiner* — Huy C Ho
(74) *Attorney, Agent, or Firm* — Browdy and Neimark, PLLC

(57) ABSTRACT

A test procedure for an emergency call network includes the following steps: A test user connection is provided between a test user and a test site and an integrated test environment. Location data are assigned to a target location of the test user, wherein such target location is to be emulated by the integrated test environment. An emergency operator connection is provided between the integrated test environment and an emergency operator in an emergency call center of the emergency call network using the assigned location data. The test user connection and the emergency operator connection are synchronized to establish an end-to-end call connection between the test user and the emergency operator. By using these steps, the expenses for performing a test procedure for an emergency call network are lowered. A test system also is presented for performing such test procedure.

7 Claims, 2 Drawing Sheets

TEST PROCEDURE FOR A MOBILE NETWORK OF AN EMERGENCY CALL NETWORK

FIELD OF THE INVENTION

The invention relates to a test procedure for a mobile network of an emergency call network. Further, the invention relates to a test system for performing such a test procedure.

BACKGROUND OF THE INVENTION

It is known from prior use to test a mobile network of an emergency call network, e. g. a network from the type enhanced 911. During such known test, a person needs to travel to different locations to make mobile test calls from these locations to the emergency call network. A correct call routing performed by the tested network then is verified by checking location data with the emergency operator during the phone call from the respective physical location of the test person.

SUMMARY OF THE INVENTION

It is an object of the invention to lower the expenses for performing a test procedure for a mobile network of an emergency call network.

Such object is met by a test procedure for a mobile network of an emergency call network, including the following steps:
- providing a test user connection between a test user at a test site and an integrated test environment,
- assigning location data to a target location of the test user wherein such target location is emulated by the integrated test environment,
- providing an emergency operator connection between the integrated test environment and an emergency operator in an emergency call center of the emergency call network using the assigned location data,
- synchronizing the test user connection and the emergency operator connection to establish an end-to-end call connection between the test user and the emergency operator.

Such test procedure produces location data by emulating the target location of the test user. Such target location then is assigned to the target location of the test user. Therefore, it is avoided that a test person needs to be sent physically around to perform the test procedure. A plurality of test calls may be performed by the test user from one and the same location assigning location data which are representative for different emulated locations, thereby efficiently testing a correct call routine by the mobile network of the emergency call network. The integrated test environment may be installed at the mobile network of the emergency call network. The connections provided by the test procedure may be established as bridged-voice connections.

The location data may include an emulated network cell ID (CID). Such CID is an example for location data usable to identify the location of a test user within a location area code or within a cellular mobile network, e.g. GSM, UMTS, LTE. The CID digits represent the ID of the sector ID of the cell and may be adapted to emulate a given cell and therefore to emulate a given target location.

The test user connection and/or the emergency operator connection may be established as a VoLTE standard connection. Such a connection ensures direct access to network services of the mobile network of the emergency call network, in particular to IMS (IP multimedia subsystem) emergency network services.

The test user connection and/or the emergency operator connection may be established via a core network. Establishing the test user cellphone connection via the core network, which also is used by an emergency call center of the emergency call network, facilitates to manipulate the location data to be assigned to the target location of the test user.

The test user connection and/or the emergency operator connection may be established via an S1 standard interface. Such S1 standard interface may be embodied as a stacked interface. Such interface is reliable and may be connected to a serving gateway of an evolved packet core of a System Architecture Evolution (SAE) architecture. Such interface also may be connected to a mobility management entity (MME), in particular of an LTE core network.

A further object of the invention is to provide a test system which is capable to perform a test procedure mentioned above. Such object is met by a test system for performing a test procedure for an emergency call network,
- providing a test user connection between a test user at a test site and an integrated test environment,
- assigning location data to a target location of the test user wherein such target location is emulated by the integrated test environment,
- providing an emergency operator connection between the integrated test environment and an emergency operator in an emergency call center of the emergency call network using the assigned location data,
- synchronizing the test user connection and the emergency operator connection to establish an end-to-end call connection between the test user and the emergency operator.

Such a test system may include a central system unit. Such central system unit may include a local processing unit. Such local processing unit may include pairs of S1 stacks, AUPS (Audio User Plane Service) and test cases, each serving to provide connections to the test user on the one hand and to the emergency operator on the other hand.

Such a test system enables the performance of the test procedure with good audio quality and with high throughput.

Embodiments of the invention are further described with help of the accompanying drawings:

DESCRIPTION OF THE PREFERRED EMBODIMENTS

Figure 1:
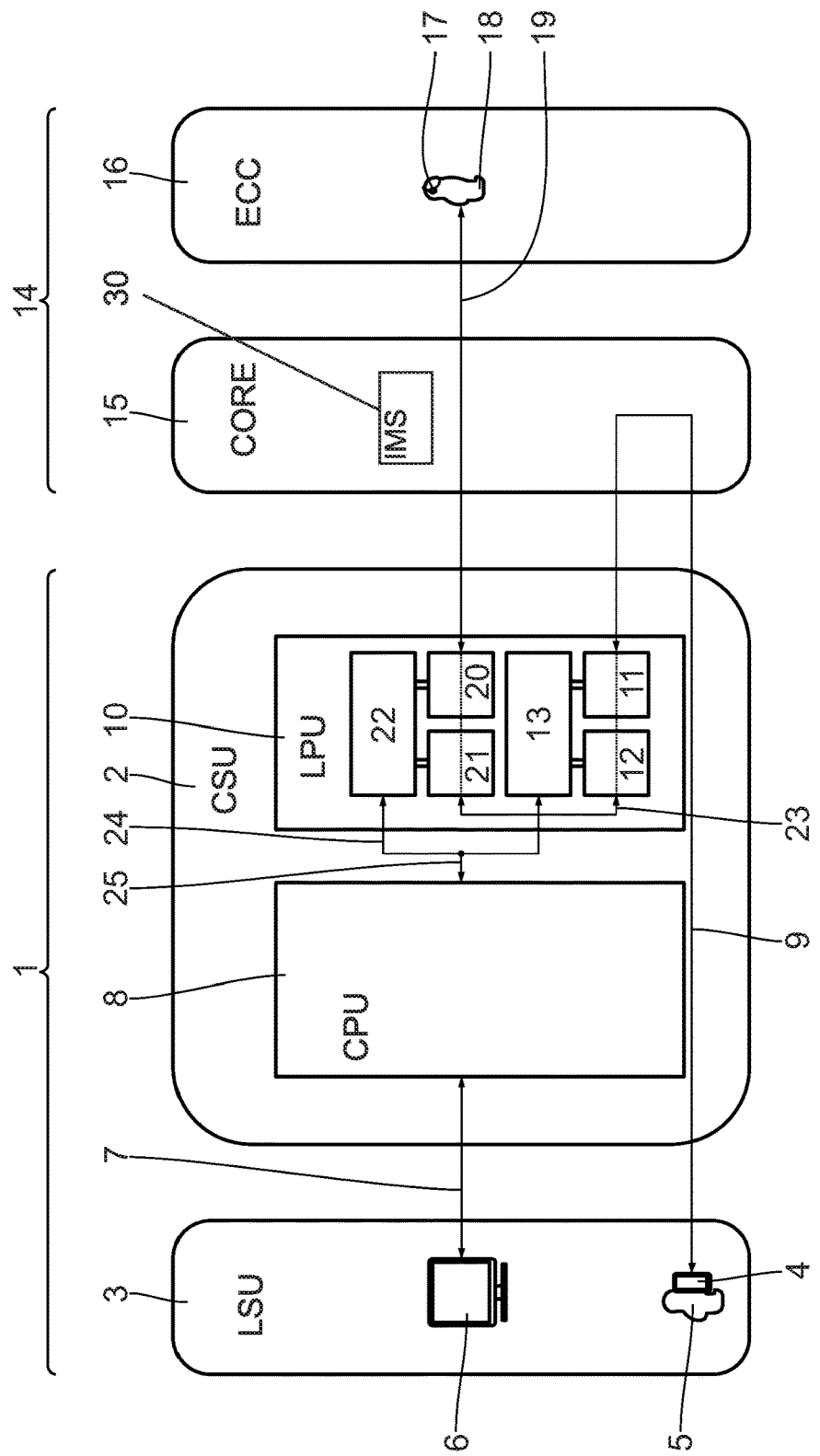
FIG. 1 shows a test system for performing a test procedure for an emergency call network.

A test system 1 for performing a test procedure for an emergency call network includes a central system unit (CSU) 2 and a local system unit (LSU) 3. The local system unit 3 comprises a smartphone 4 or a desk phone (land line) which can be operated by a test user 5 and further comprises a user interface 6. The user interface 6 may be embodied as a client computer or as a terminal.

The central system unit 2 in the following also is referred to as an integrated test environment. The local system unit 3 is also referred to as a test site.

The user interface 6 of the local system unit 3 is in signal connection 7 with a central processing unit (CPU) 8 of the central system unit 2. Such signal connection 7 may be embodied via a VPN network or via a kind of wireless telecommunications network.

The smartphone 4 is via a test user cellphone connection 9, in signal connection with a local processing unit (LPU) 10 of the central system unit 2.

In particular, the test user cellphone connection 9 is between the smartphone 4 and a first S1 stack 11 of the local processing unit 10.

The S1 stack 11 is further connected to a first AUPS (Audio User Plane Server) 12 and to a first side 13 of a test case of the local processing unit 10 of the central system unit 2.

The test system 1 is designed for communication with an emergency call network 14 which includes a core network 15 also including an IP multimedia core network subsystem (IMS) 30. The core network 15 is part of the mobile network of the emergency call network 14. The test user cellphone connection 9 is established via the core network 15. The emergency call network 14 further includes an emergency call center (ECC) 16. In the shown embodiment, the termination of the call at the emergency call center 16 is indicated by a further phone 17, shown exemplified as a headset, which is handled by an emergency operator 18 at the emergency call center 16. The emergency call network 14 may be part of an enhanced 911 system and also is referred to as E911 platform.

Via the core network 15, a signal connection 19 is established between the emergency call center phone 17 and a second S1 stack 20 of the local processing unit 10 of the central system unit 2 of the test system 1. The second S1 stack 20 is further in signal connection with a second AUPS 21 and a second side 22 of the test case of the local processing unit 10.

The S1 stacks 11 and 20 include a S1 standard interface which is known from the system architecture evolution of the LTE wireless communication standard. The S1 standard interface is an exemplary embodiment and is based on 3GPP LTE Architecture. There are two aspects that define an S1 stack, one aspect are the control plane protocols and the other aspect are the user plane protocols.

The control plane protocols include: NAS as defined in 3GPP 24.301 (portal.3gpp.org/desktopmodules/Specifications/SpecificationDetails.aspx?specificationId=1072), S1-AP as defined in 3GPP 36.413 (portal.3gpp.org/desktopmodules/Specifications/SpecificationDetails.aspx?specificationId=2446), SCTP as defined in RFC 4960 (tools.ietf.org/html/rfc4960), IPv4 as defined in RFC 791 (tools.ietf.org/html/rfc791) and IPv6 as defined in RFC 2460 (www.ietf.org/rfc/rfc2460.txt). The above standards and webpages, as well as any others that are cited in this application, are hereby incorporated by reference, as if incorporated in their entirety herein.

The user plane protocols include: GTP-U as defined in 3GPP 29.281 (portal.3gpp.org/desktopmodules/Specifications/SpecificationDetails.aspx?specificationId=1699), UDP as define in RFC 768 (tools.ietf.org/html/rfc768), IPv4 as defined in RFC 791 (tools.ietf.org/html/rfc791), and IPv6 as defined in RFC 2460 (www.ietf.org/rfc/rfc2460.txt).

The two AUPS 12, 21 are connected via a signal connection 23. The two parts or sides 13, 22 of the test case are interconnected via a further signal connection 24 and further are connected to the central processing unit 8 via a signal connection 25.

The respective S1 stack 11, 20 is used to create an S1 interface that connects towards the MME (mobility management entity) and the SGW (serving gateway). The connection is both physical and logical. Essentially, the S1 stack emulates an EUTRAN (evolved UTRAN, evolved UMTS terrestrial radio access network) layer. From network perspective, the S1 stack 11 and 20 appear as fully functional eNodeB. The S1 stack 11, 20 is configured to initiate standard and emergency VoLTE calls over the S1 interface as a real subscriber, therefore it implements both signaling plane and user plane protocols, in particular according to the specification 3GPP TS 24.229 (portal.3gpp.org/desktopmodules/Specifications/SpecificationDetails.aspx?specificationId=1055). The two S1 stacks 11, 20 are automated and controlled by the test case. There are two separate S1 stacks in order two execute two separate VoLTE calls. One call leg is established to the tester and the other call leg is established with the E911 operator/platform. The call leg towards the E911 platform emulates the desired testing location e.g. the tester might be sitting in Toronto CA but he will emulate the E911 call as coming from Montreal CA. Montreal CA will be the desired testing location. The test case is parameterized and scheduled by the tester/user of the integrated system.

The AUPS 12, 21 is responsible for coding and decoding of the voice signals and IP packetization of the VoLTE calls towards the E911 platform 14 and the tester 5. The voice signals are mixed by the AUPS 12, 21 to bridge the two separate calls that are initiated by the test case 13, 22 and the S1 stacks 11, 20 respectively. The AUSP implements the following standardized CODECs and transcoding functions: Adaptive multi-rate (AMR) as defined in 3GPP TS 26.090 (www.3gpp.org/DynaReport/26090.htm), Adaptive multi-rate wideband (AMR-WB) as defined in 3GPP TS 26.190 (www.3gpp.org/DynaReport/26190.htm), Enhanced Voice Services (EVS) 3GPP TS 26.441 (www.3gpp.org/DynaReport/26441.htm)

The test case 13, 22 gets the parameters from the CPU 8 and drives the main logic of the whole testing procedure. The activation of the S1 stacks 11, 20, S1 interfaces, AUPS 12, 21 and synchronization of the two sides is done by the test case 13, 22. As noted above, test case 13, 22 has two main parts, side A and side B. Side A, i.e. test side 22, is activated initially to establish a call with the tester 5 via S1 stack 11 and S1 interface. Once the call is established with the tester 5, it activates the second part, side B, i.e. side 13, which establishes a call towards the E911 platform via S1 stack 20 and S1 interface. Once the call is established on both sides, the test case 13, 22 will start the AUPS 12, 21 in order to bridge the voice between two calls. In this way, the tester 5 from the user location will have a direct audio call with the E911 operator 18.

Figure 2:
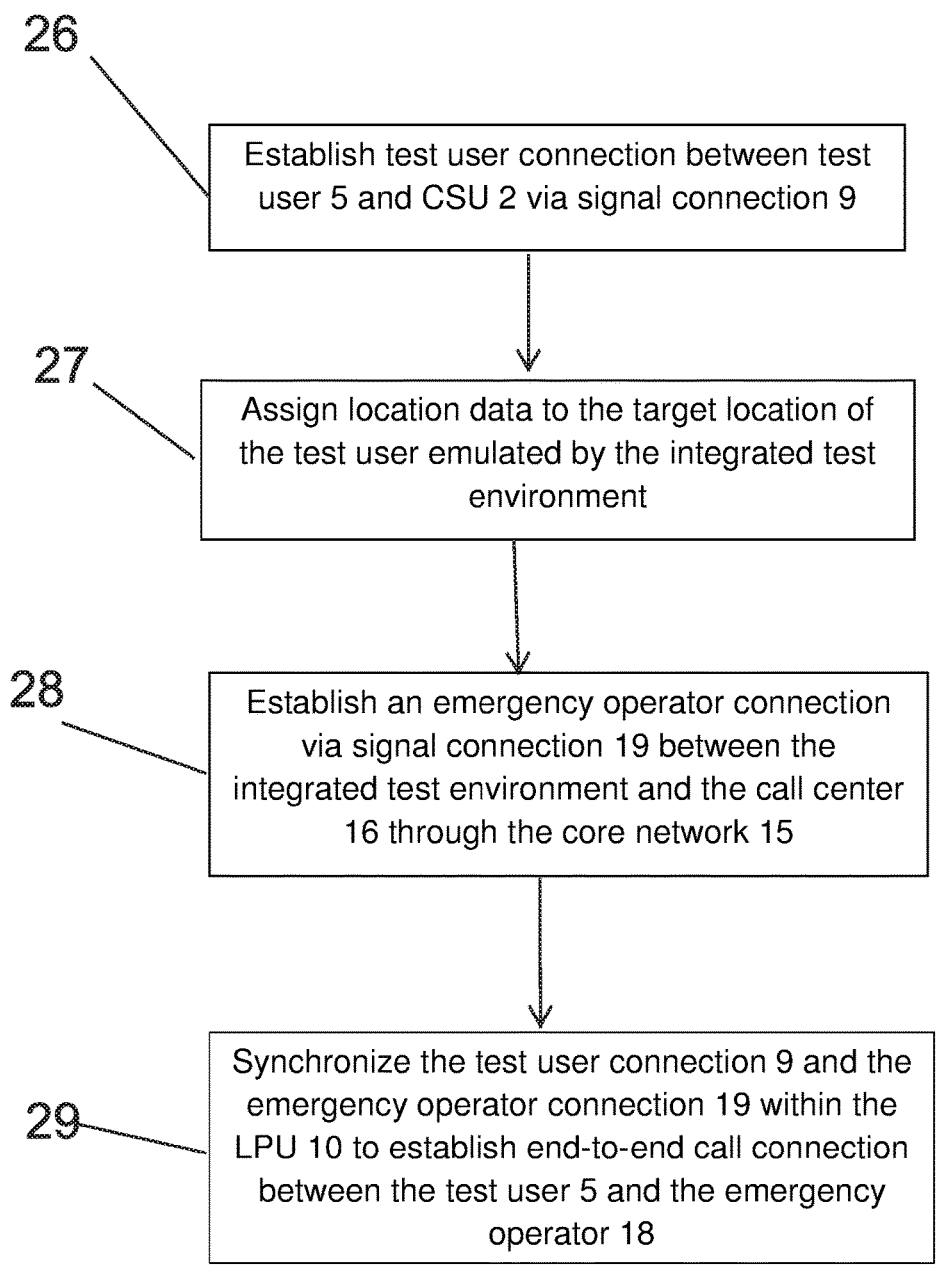
FIG. 2 schematically shows key steps of such test procedure.

By using the test system 1, the test procedure for the emergency call network 14 is performed as explained with respect to FIG. 2:

In a first provision step 26, a test user connection is established between the test user 5 and the integrated test environment, i.e. the control system unit 2. Such test user connection is established via the signal connection 9. It is to be noted that the signal connection 9, i.e. the test user connection, is established via the core network 15 of the emergency call network 14.

Further, in an assignment step 27, location data are assigned to a target location of the test user. Such target location is emulated by the integrated test environment 2. This may be done by respectively manipulating a data string of a network cell ID (CID). Specifically, such data string manipulation is done via manipulating a P-access-networkinfo SIP parameter. Such parameter in particular is defined in RFC (request for comments) 3455 (tools.ietf.org/html/rfc3455). For example, the user will input a particular string of numbers that relate to a particular cell ID that is known to the mobile network operator and the user.

In a further provision step 28, an emergency operator connection is established via signal connection 19 between the integrated test environment and the call center 16 of the emergency operator 18, again through the core network 15. Such provision step 28 is performed using the location data assigned in the assignment step 27. This procedure is standardized and explained in section "4.7.5 Location in emergency calls" from 3GPP 24.229 (portal.3gpp.org/desktopmodules/Specifications/SpecificationDetails.aspx?specificationId=1055).

Further, in a synchronization or audio briding step 29, the test user connection 9 on the one hand and the emergency operator connection 19 on the other are synchronized or bridged within the local processing unit 10 of the central system unit 2 to establish an end-to-end call connection between the test user 5 and the emergency operator 18. Such synchronization step 29 takes place between the two AUPS 12, 21.

After such synchronizing step, the test call between the user 5 and the operator 18 can take place. Such test call then requires the equipment of the emergency call center 14 to be tested as if a test user would be located physically at the emulated location. For example, the tester would introduce himself to the E911 operator that this is a test call and he would state his name, and mobile operator. After that he will tell the E911 operator that he is calling from a particular location and the E911 operator will have to validate the appearance of that location in their system. In that manner, one and the same user 5 physically located at the local system unit 3 may perform several test calls from a lot of different emulated locations thereby efficiently testing the local coverage of the emergency call network.

The test user connection 9 on the one hand and the emergency operator connection 19 on the other may be established in the provision steps 26 and 28 as a VoLTE (Voice over Long-Term Evolution) standard connection. Other connection types could be used as well.

By performing such procedure, a target location of the test user 5 is emulated which is independent of the actual physical location of the test user 5. A given target location of the test user 5 which shall be tested and which might be far from the actual physical location of the test user 5 is assigned in the test procedure during the assignment step 27 and solely depends on the assigned location data. Such location data include an emulated network cell ID (CID).

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any non-transitory medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CDROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

The present invention is configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

Having now fully described this invention, it will be appreciated by those skilled in the art that the same can be performed within a wide range of equivalent parameters, concentrations, and conditions without departing from the spirit and scope of the invention and without undue experimentation.

When a single device or article is described herein, more than one device/article (whether or not they cooperate) may alternatively be used in place of the single device/article that is described. Similarly, where more than one device or article is described herein (whether or not they cooperate), a single device/article may alternatively be used in place of the more than one device or article that is described.

The functionality and/or the features of a device that is described may be alternatively embodied by one or more other devices which are not explicitly described as having such functionality/features. Thus, other embodiments need not include the described device itself.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

While this invention has been described in connection with specific embodiments thereof, it will be understood that it is capable of further modifications. This application is intended to cover any variations, uses, or adaptations of the inventions following, in general, the principles of the invention and including such departures from the present disclosure as come within known or customary practice within the art to which the invention pertains and as may be applied to the essential features hereinbefore set forth as follows in the scope of the appended claims.

Reference to known method steps, conventional methods steps, known methods or conventional methods is not in any way an admission that any aspect, description or embodiment of the present invention is disclosed, taught or suggested in the relevant art.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A test procedure for an emergency call network, including the following steps:
   providing a test user connection between a test user at a test site and an integrated test environment,
   assigning location data to a target location of the test user wherein such target location is emulated by the integrated test environment,
   providing an emergency operator connection between the integrated test environment and an emergency operator in an emergency call center of the emergency call network using the assigned location data,
   synchronizing the test user connection and the emergency operator connection to establish an end-to-end call connection between the test user and the emergency operator,
   wherein during the test procedure a plurality of test calls is performed by the test user from one and the same location, wherein location data are assigned which are representative for different emulated locations.

2. A test procedure according to claim 1, wherein the location data includes an emulated network cell ID.

3. A test procedure according to claim 1, wherein at least one of the group of
   the test user connection, and
   the emergency operator connection
   is established as a VoLTE standard connection.

4. A test procedure according to claim 1, wherein at least one of the group of
   the test user connection, and
   the emergency operator connection
   is established via a core network.

5. A test procedure according to claim 1, wherein at least one of the group of
   the test user connection, and
   the emergency operator connection
   is established via a S1 standard interface.

6. A test system for performing a test procedure for an emergency call network, including the following steps:
   providing a test user connection between a test user at a test site and an integrated test environment,
   assigning location data to a target location of the test user wherein such target location is emulated by the integrated test environment,
   providing an emergency operator connection between the integrated test environment and an emergency operator in an emergency call center of the emergency call network using the assigned location data,
   synchronizing the test user connection and the emergency operator connection to establish an end-to-end call connection between the test user and the emergency operator,
   wherein during the test procedure a plurality of test calls is performed by the test user from one and the same location, wherein location data are assigned which are representative for different emulated locations.

7. A test system for performing a test procedure for an emergency call network, the system comprising:
   a central processor,
   a local processor in signal connection with the central processor,
   a mobile phone in signal connection with the local processor, and
   a core network over which the mobile phone communicates with the local processor and the central processor, the core network comprising an emergency call center,
   wherein the mobile phone is configured to establish a test user connection between a test user at a test site and the central processor over the core network,
   wherein the central processor is configured to assign location data to a target location of the test user and emulate the target location,
   wherein the central processor is configured to provide an emergency operator connection between the central processor and an emergency operator in the emergency call center through the core network using the assigned location data,
   wherein the local processor is configured to synchronize the test user connection and the emergency operator connection to establish an end-to-end call connection between the test user and the emergency operator,
   wherein a plurality of test calls are placed during the test procedure by the test user from one and the same location, wherein location data are assigned which are representative for different emulated locations.

\* \* \* \* \*